US012770097B2

(12) United States Patent
Hermsen et al.

(10) Patent No.: US 12,770,097 B2
(45) Date of Patent: Oct. 20, 2026

(54) STORAGE SYSTEM

(71) Applicant: Inther Logistics Robotics B.V., Venray-Oostrum (NL)

(72) Inventors: Paul Frederik Leonard Antoon Hermsen, Venray-Oostrum (NL); Mattheus Cornelius Antonius Herder, Venray-Oostrum (NL); Mike John Alice Strijbos, Venray-Oostrum (NL)

(73) Assignee: Inther Logistics Robotics B.V., Venray-Oostrum (NL)

( * ) Notice: Subject to any disclaimer, the term of this patent is extended or adjusted under 35 U.S.C. 154(b) by 168 days.

(21) Appl. No.: 18/467,141

(22) Filed: Sep. 14, 2023

(65) Prior Publication Data

US 2024/0086838 A1 Mar. 14, 2024

(30) Foreign Application Priority Data

Sep. 14, 2022 (NL) ...................................... 2033022

(51) Int. Cl.

| | |
|---|---|
| ***G06Q 30/0601*** | (2023.01) |
| ***B65G 1/04*** | (2006.01) |
| ***G05D 1/00*** | (2006.01) |
| ***G06F 3/14*** | (2006.01) |
| ***G06Q 10/087*** | (2023.01) |
| ***G06V 20/50*** | (2022.01) |
| ***G06V 40/10*** | (2022.01) |

(52) U.S. Cl.
CPC ............. *G06Q 10/087* (2013.01); *B65G 1/04* (2013.01); *B65G 1/0492* (2013.01); *G05D 1/0214* (2013.01)

(58) Field of Classification Search
CPC .... B65G 1/04; B65G 2207/30; B65G 1/0492; B65G 1/0478; F17C 2203/0612; F17C 2203/0626; F17C 2203/0631
See application file for complete search history.

(56) References Cited

U.S. PATENT DOCUMENTS

| | | | | |
|---|---|---|---|---|
| 11,453,552 | B2 * | 9/2022 | Lindbo | G06Q 10/083 |
| 12,180,004 | B2 * | 12/2024 | Durkee | G07F 17/12 |
| 2004/0191032 | A1 * | 9/2004 | Foulke | B65G 1/04 414/280 |
| 2008/0231157 | A1 | 9/2008 | Lowe | |

(Continued)

FOREIGN PATENT DOCUMENTS

| | | | | |
|---|---|---|---|---|
| CH | 713385 | A2 * | 7/2018 | B01L 1/00 |
| CN | 101705753 | A * | 5/2010 | |

(Continued)

*Primary Examiner* — Florian M Zeender
(74) *Attorney, Agent, or Firm* — Heslin Rothenberg Farley & Mesiti P.C.

(57) ABSTRACT

The present invention relates to a storage system, in particular an automatic (and modular) storage and retrieval system, comprising a central column, extending in a substantial vertical direction; a set of at least six storage locations, each of the storage locations extending from the column in a substantial horizontal direction at the same vertical level; wherein the at least six of the storage locations are pair-wise arranged on opposite sides of the column; and wherein the column is substantially polygonal, wherein at least one of the storage locations at a vertical level extend from one of the sides of the polygonal column.

20 Claims, 11 Drawing Sheets

(56) References Cited

U.S. PATENT DOCUMENTS

| | | | | |
|---|---|---|---|---|
| 2014/0100998 | A1* | 4/2014 | Mountz | G06Q 10/08 705/28 |
| 2015/0307276 | A1* | 10/2015 | Hognaland | B65G 1/137 |
| 2016/0060037 | A1* | 3/2016 | Razumov | B65G 1/065 700/216 |
| 2017/0101263 | A1* | 4/2017 | Schroer | B65G 1/0492 |
| 2017/0321397 | A1 | 11/2017 | Kent et al. | |
| 2019/0344965 | A1* | 11/2019 | Wilkinson | G07F 11/42 |
| 2019/0375594 | A1* | 12/2019 | Tovey | B65G 1/1375 |
| 2019/0382203 | A1* | 12/2019 | Middelberg | A47B 49/00 |
| 2020/0017300 | A1* | 1/2020 | Durkee | G06Q 10/087 |
| 2021/0403846 | A1 | 12/2021 | Gilligan et al. | |
| 2022/0016756 | A1* | 1/2022 | Balasubramanian | B65G 54/02 |
| 2022/0383690 | A1* | 12/2022 | Zou | G07F 11/16 |

FOREIGN PATENT DOCUMENTS

| | | | | | |
|---|---|---|---|---|---|
| CN | 102287068 | A | * | 12/2011 | |
| CN | 107658311 | A | * | 2/2018 | H01L 21/76816 |
| CN | 108382776 | A | * | 8/2018 | B65G 1/0407 |
| CN | 208329795 | U | * | 1/2019 | |
| CN | 111573113 | A | * | 8/2020 | B65G 1/0407 |
| CN | 112938277 | A | | 6/2021 | |
| CN | 215400237 | U | * | 1/2022 | |
| EP | 3142085 | A1 | * | 3/2017 | B65G 1/04 |
| WO | WO-2017192783 | A1 | * | 11/2017 | B07C 3/006 |
| WO | WO-2019094511 | A1 | * | 5/2019 | B65G 1/0492 |
| WO | WO-2020014374 | A1 | * | 1/2020 | B65G 1/04 |
| WO | WO-2022032831 | A1 | * | 2/2022 | B65G 1/04 |
| WO | WO-2023001955 | A1 | * | 1/2023 | B65G 1/04 |

* cited by examiner

STORAGE SYSTEM

CROSS REFERENCE TO RELATED APPLICATIONS

This application claims priority under 35 U.S.C. § 119 to Netherlands Patent Application No. 2033022, filed Sep. 14, 2022, which is incorporated herein by reference in its entirety.

FIELD OF THE INVENTION

The present invention relates to a storage system, in particular an automatic (and modular) storage and retrieval system.

BACKGROUND

Automatic storage and retrieval systems, sometimes known as ASRS or AS/RS, are made of a variation of computer-controlled systems that automatically place and retrieve loads from set storage locations in a facility with precision, accuracy and speed. These systems are typically used in applications where high volumes of inventory move in-and-out of manufacturing or distribution operations. Upgrading to an automated storage system improves throughput, storage density and efficiency with reliable, secure storage that eliminates damage to products and equipment while providing safer, more ergonomic working conditions.

To store the goods different storing systems are known. At present the goods may be stored on storage locations, in long rows in a warehouse, or use is made of stacking crates, which are stacked and de-stacked from above to unearth the desired crate from the stack of crate to find the goods (in that crate). Although such systems work in practice, they are relatively inefficient in terms of floor planning or throughput performance. Moreover such systems are also relatively inflexible and their lay-out is fixed, which makes expanding or reducing the amount of storage cumbersome.

The present invention aims to overcome that problem and aims to provide an efficient and flexible storage system. To that end the invention proposes a storage system according to claim 1. The present invention relates to a storage system, in particular an automatic (and modular) storage and retrieval system, comprising:

- a central column, extending in a substantial vertical direction, comprising multiple vertical levels;
- a set of (at least) six storage locations each of the storage locations extending in a substantial horizontal direction at the same vertical level with respect to the central column;
- wherein the at least six of the storage locations are pair-wise arranged on opposite sides of the column;
- wherein the column is substantially polygonal, in particular hexagonal or rectangular, wherein at least six storage locations at the same vertical level extend from one of the sides of the polygon.

Preferably the system according to the present invention comprises six storage locations at each vertical level of a column. In particular, the storage locations are positioned stationary with respect to the central column. Also, the central column itself is preferably a stationary column. The invention does therefor not relate to a carrousel or a carrousel-like system, since carrousel storage systems comprise a dynamic positioning of storage locations with respect to the central column.

The storage system according to the invention is a modular system, wherein each module of the system is based around a polygonal central column extending in vertical direction. From the column the horizontally extending storage locations are directly or indirectly accessible. At different vertical levels of that column storage locations extend, typically in horizontal direction, which (rectangular) storage locations are used to store or house the goods. Typically, the storage locations are rectangular, fitting the industry standard. The rectangular storage locations may allow for crates or (carton) boxes or shelves or the like. At one storage location multiple crates or boxes or the like can be present, although typically one crate or box is present per storage location. It is also possible that multiple sub pick locations are defined in one storage location.

The storage locations may be rectangular shaped. Preferably, the sides of said rectangular shaped have a ratio between 1.6-1.9:1, more preferably of substantially 2:3 or 1.77:1 or 1.86:1. As another example, the storage location may comprise a rectangular shape with two longer opposite sides and two shorter opposite sides in a ratio between 1:1.25-1.75, more preferably between 1:1.45-1:1.55, even more preferably substantially 1:1.45 or substantially 1:1.5 or substantially 1:1.55. The rectangular shape of a storage location, if applied, may also have a longer:shorter side ratio in the range of 1.6-1.9:1, more preferably of 1.77:1 or 3:2 or 1.86:1. Measurements of a storage location may be 600×400 mm or 650×450 mm, meeting the standards of the industry. In case the system is configured for handling pallets, the ratio between the side:side ratio of the storage locations may be substantially 1:1.5 and/or 1:1.2. Along a vertical line multiple storage locations are typically present, one above the other, which storage levels are (directly or indirectly) accessible from a load handling device in the central column. The handling device can be going upward or downward in that column. The load handling device may have different orientations within the column, depending on which storage location it wants to get access to. The load handling device may comprise a rotation mechanism, so that the load handling device may rotate within the column. Or the load handling device may position itself or be positioned in the correct orientation with respect to the storage locations below or on top of, the central column. In a preferred embodiment the load handling device can freely displace itself below the central column, or if applied, below multiple central columns. The load handling device may comprise two parts wherein one part moves horizontally below the columns and a second part moves vertically within a central column, or the device may be a single device that both moves horizontally and vertically. It is also possible that the load handling device has a shape corresponding to the central column and as such cannot rotate within the column. Optionally, an additional rotating platform on top of or as part of load handling device is also possible.

A pair of storage locations comprises two storage locations, wherein a first storage location of the pair is positioned at one side of the central column and a second storage location of the pair is positioned at the opposite side thereof of the central column. Each storage location can be directly or indirectly accessible from the central column. Typically, from each side of the polygonal central column one storage location can be directly accessible.

A set of horizontally extending storage locations typically is positioned at a certain vertical level. Hence, a vertical storage level comprises a set of horizontally extending storage locations. At a certain vertical level the storage locations of that module at that level are all accessible from the central column. Access can be given because one of the sides of the central column is adjacent to one of the sides of the storage location. Or, the storage location may be accessible indirectly, for example via or through a directly accessible storage location. An indirectly accessible storage location may be used for slowmovers and the directly accessible storage locations may be used for fastmover products. Indirectly accessible storage locations are advantageous for a product portfolio including slow movers.

The storage and retrieval system according to the present invention is in particular advantageous because it can be expanded after initial installation. It is possible to expand the number of modules and as such expand the storage capacity. This can be done by adding more columns with corresponding storage locations. A load handling device or robot can be programmed to also include the additional modules into its operations. This modular aspect of the system according to the present invention can be advantageous for scalable business, or for starting business, or for business who cannot invest in a full system and as such spread costs and risks. Furthermore, the amount of vertical storage levels of system according to the present invention is flexible. The storage system can start with N number of vertical storage levels and after some time in operation it is possible to expand the vertical column in height and add more vertical storage levels to form N-X vertical storage levels in that column. Each vertical storage level comprising a set of horizontally extending storage locations. In a preferred embodiment, all modules have the same height comprising the same number of vertical storage levels. It is also possible that different modules have a different height, for example to fit the building wherein the system according to the present invention is operational. This is for example advantageous for buildings which seem not so suitable for (conventional) automatic storage and retrieval systems. Using the system according to the invention makes these buildings suitable for storage and retrieval operations.

As described above, it is advantageous that using the system according to the present invention the floor space can be used very efficiently and flexibly. Another advantage is that the present invention provides for an efficient storage system. Depending on the slowmover:fastmover ratio a fitting layout for an automatic stock retrieval system can be installed, with either all directly accessible storage locations (low amount of slowmovers) or including indirectly accessible storage locations (productportfolio including slowmovers).

An advantage of the present invention is that a fitting layout can be chosen, either wherein in an embodiment each storage location can be directly accessible from the central column, or in an alternative embodiment wherein at least one storage location is indirectly accessible from the central column.

Preferably each storage location comprises a similar shape and/or surface area.

The at least six storage locations, in particular the six storage locations, are pair-wise arranged. Preferably the storage locations are arranged into three pairs. Each pair comprises at least two opposite storage locations at the same vertical level. In an embodiment, the three pairs are mutually substantially positioned at an angle of substantially 60 degrees. In said embodiment preferably a hexagonally shaped central column is used. In an alternative embodiment, a rectangular or squared central column is used and two pairs of storage locations are directly accessible and one pair of storage locations is indirectly accessible from the central column. In this embodiment, the pair of directly accessible storage locations are mutually substantially perpendicular positioned.

The present invention comprises a very efficient storage space to floor space ratio. The storage space may be defined by the total area that is needed for the storage locations and the floor space may be defined by the total area that is needed on ground floor level for the column and the storage locations and possible void areas. Preferably the present invention has a storage space:floor space ratio within a range of 1:1.40 to 1:2.60, preferably 1:1.80-1:2.40, more preferably 1:1.95-2:30. Specific embodiment of the present invention comprising a rectangular central column may have a storage space:floor space ratio of 1:1.96. another specific embodiment of the present invention comprising a hexagonal central column may have a storage space:floor space ratio of 1:2.25.

The column may for instance comprise at least two, preferably three, even more preferably at least four uprights in (predefined) corners of the column, to support the central column. A hexagonal column requires at least three uprights for a stable construction. Whereas for a rectangular or square column four uprights would be needed. The central column may comprise at least one vertical track for allowing load handling devices, such as robots, to travel in vertical direction in the central column, wherein preferably the track is provided on at least one of the uprights. The tracks may be any track, route, walkway or lane used to allow automated vehicles or robots to travel upward and downward along the central column. Contrary to standard warehousing, where storage extends along horizontal paths, the proposed solution is one where storage extends vertically, along a central column.

In a preferred embodiment each column comprises storage locations at different vertical levels, to optimize the use of space. Each column may for instance have storage locations at 10 vertical levels, which results in 60 storage locations per column, namely 6 per level and 10 levels. This is only an example, storage systems with more than 10, for example 25 or 50 vertical storage levels are also possible. Seen as a base plan the central column may have a storage location extending from each side of the central column. For multiple levels, each (pair of) storage location(s) is part of a stack of storage locations. The stack of storage locations are preferably stationary positioned. An advantage of this embodiment is that it is possible to scale the present invention in height, by adding more vertical levels of storage locations, and in horizontal direction by adding more columns and storage locations (more modules). In an embodiment the height in vertical direction of the storage system is at least 2 m, preferably at least 4 m, more preferably at least 6 m, for instance at least 10 m or at least 12 m.

In an embodiment, all storage locations are directly accessible from the central column. In said embodiment it is preferred that the central column has a hexagonal shape. In particular, the shorter side of the storage location is directly accessible from a side of the (hexagonal) central column. The shorter side of the storage location may be adjacent to the side of the central column. Alternatively, it is possible that the storage locations are square-shaped or that a longer side of a rectangular storage location is directly adjacent to the central column. The storage location may for instance be formed by beams or lips extending from a central pillar.

In another embodiment, at least one of the storage locations is indirectly accessible from the central column. For example, one pair of opposite storage locations is indirectly accessible, and positioned behind another pair of opposite storage locations (as seen from the central column). From this example an elongated plus shape follows, wherein two sides of the plus are longer than the other two sides.

In said embodiment, at least four of the storage locations are directly accessible from the central column and at least two are indirectly accessible from the central column.

For a smooth handling it is convenient that the storage locations are configured for storage by using standardized crates or boxes. It is also possible that the system is configured for storing and retrieving pallets. This also facilitates handling before and after storage in the automatic storage system according to the present invention. It is preferred that each of the storage locations has the same size or floor plan. For example, a rectangular shape with two longer opposite sides and two shorter opposite sides in a ratio between 1:1.25-1.75, more preferably between 1:1.45-1:1.55, even more preferably substantially 1:1.45 or substantially 1:1.5 or substantially 1:1.55. The rectangular shape of a storage location, if applied, may also have a longer:shorter side ratio in the range of 1.6-1.9:1, more preferably of 1.77:1 or 3:2 or 1.86:1. Measurements of a storage location may be 600×400 mm or 650×450 mm, meeting the standards of the industry. In case the system is configured for handling pallets, the ratio between the side: side ratio of the storage locations may be substantially 1:1.5 and/or 1:1.2. For handling of the boxes or crates, the size of the central column may correspond to the size of the storage locations and/or be slightly bigger. Depending on the load handling device chosen, other options are also conceivable. For example, it is possible that the central column comprises a bigger size or diameter than the storage locations. It is also possible that the storage locations are deeper, the depth extending from the central column in horizontal direction, and the central column being smaller than the storage locations.

In an embodiment of the system according to the present invention, a bottom and/or top level of the central column can be free from storage locations. In said embodiment at least part of the robotic vehicles can be allowed to pass under or on top of central columns. If applied, this embodiment also allows for at least part of the robotic vehicle to enter the central column. In an embodiment the bottom and/or top level can be used as temporary storage location or switching location.

The storage locations are preferably rectangular shaped. Preferably one side of a rectangular shaped storage location is positioned in parallel with one side of the central column. For a rectangular shaped column, with a size preferably corresponding to a storage location size the longer sides of the rectangles are preferably placed facing each other and the shorter sides are positioned facing each other. Hence, in this embodiment, not only the shape but also the size is preferably corresponding (similar) to the size of the column.

In an embodiment wherein the central column is hexagonal shaped, the shorter side edge of the storage location preferably corresponds to, and is preferably positioned facing, a side edge of the hexagonal shaped central column. The storage locations may for instance house crates or other uniformly sized containers or trays. These containers travel along the central column to or from a desired height. To allow this travel and to optimize the use of available space it is beneficial if the storage locations' length corresponds to the length between two opposite sides of a hexagonal column. This means that if a crate (with maximized dimensions equal to the storage location) placed in a storage location is picked it cannot rotate within the hexagonal column.

In an embodiment with a polygonal central column, preferably each storage location, preferably comprises a width similar to the length of an edge of the column and a length equal to the length between two opposite sides of the polygonal, optionally hexagonal, column.

The bottom level or the top level of each column may be free of storage locations. This creates a pathway at the bottom or the top of the module to allow automated vehicles to travel from and to the central columns. The pathway may also allow for a robot or load handling device to position itself in a predefined orientation in the central column. The pathway may also lead to a conveyor or other I/O point, for pulling the tote from the cart onto the conveyor and putting a returning tote from the conveyor onto the cart.

In a preferred embodiment both the bottom and top level of each column may be free of storage locations and allows automated vehicles, or robots, to travel. This creates a pathway on top and on the bottom of the columns. Any vehicle or load carrier may enter the column to pick up or drop of a load and then proceed either in the same direction or return in the opposite direction, increasing the flexibility and possible movements in the system. For instance a vehicle may enter a column from below, travel to a vertical level to pick up or drop of a load and choose to drop back down or continue to the top to reach one of the pathways.

Alternatively or in addition, the top level of each column may be arranged for automated vehicles to travel from and to columns and/or to a conveyor.

Optionally, each storage location comprises two storage areas. The storage areas may be arranged next to or behind each other (seen from the central column). In a preferred embodiment the system comprises one central column with six storage locations, on at least four, optionally six, sides of the central column. Optionally the system may comprise one central column with up to twelve storage areas or storage locations, divided over six sides of the central column.

The storage location may comprise a horizontal support, for supporting a crate or other uniformly sized container, for instance formed by lips or angle iron, preferably arranged on two sides of the storage location. The support preferably allows sliding of the crate or container or tray in horizontal direction, from or towards the central column. In a preferred embodiment each storage location comprises two parallel horizontal supports. Said supports extend from a side of the central column. It is possible that the horizontal supports are mutually connected by a stiffening element.

Typically a module comprises one central column and (at least) six storage locations. Seen from a top or bottom view the central column and the storage locations together may be substantially honeycomb-shaped.

The hexagonal (or polygonal), central column with storage locations extending from that column creates a honeycomb-shaped structure. Seen as a base plan the central column may have six storage locations, each storage location extending from each side of the column. Typically several components together, one central column and from the sides of the column extending storage locations, preferably six storage locations, are arranged to form the honeycomb-shape (honeycomb-shaped module). An advantage of this shape is that another honeycomb-shaped module can be placed next to it, slightly off set, to make efficient use of the space available.

In another embodiment of the storage system according to the present invention, seen from a top or bottom view the central column and the storage locations together may be substantially elongated plus-shaped. In said embodiment one pair of storage locations is positioned perpendicular to two other pairs of storage locations, with respect to the central column. This results in double deep storage locations and a pair of single deep storage locations. Preferably, the double-deep storage locations are positioned such that the longer side of the rectangular shaped storage location is adjacent to the longer side of the rectangular central column. The pair of single deep storage locations is preferably adjacent to the central column at the shorter side of the storage location and shorter side of the rectangular central column. This is a preferred configuration, since it provides for a short gap between the central column and the double deep storage location. This shortens the time to reach the storage location and thus the time to store and/or retrieve goods from the location. Alternatively, the two pairs forming double deep storage locations can have their shorter side with the central column and the pair of single deep storage locations can have their long side adjacent to the central column. It is also possible that all storage locations which are adjacent to the central column share their longer side with the central column, wherein the central column would preferably be squared. Or alternatively wherein all storage locations which are adjacent to the central column share their shorter side with the central column, wherein the central column would preferably be squared.

In a preferred embodiment the system according to the present invention comprises multiple central columns, preferably at least ten central columns, even more preferably at least twenty central columns. In such an embodiment, each central column comprises preferably six storage locations at each vertical level.

In a preferred embodiment the storage system according to the invention comprises multiple columns with storage locations (multiple modules), each column provided with a set of at least six storage locations. In this embodiment, the modules are positioned substantially next to each other. Typically all modules comprise a similar floor plan. On the other hand it is also optional to use several types of modules, such as honeycomb shaped module or an elongated plus shape module, combined.

A honeycomb-shaped configuration allows placement of columns and storage locations next to each other, in particular in a modular fashion. The columns may be positioned on a (honeycomb) grid or in a grid-like pattern. In such (honeycomb) grid the modules may be mechanically connected. More columns with extending storage locations (modules) can be added to expand the storage system.

For an efficient storage system it is preferred that a high storage density can be achieved. It is beneficial if the system comprises multiple modules. Preferably, the storage system according to the present invention comprises multiple columns (modules) which are positioned substantially next to each other and preferably positioned on a grid or in a grid-like pattern and in particular wherein at least part of the storage locations is adjacent to a storage location of an adjacent column. Storage locations at the same vertical level are adjacent to storage locations of other modules which are at the same vertical level.

Alternatively, or in addition, multiple columns can be positioned substantially next to each other and preferably positioned on a honeycomb or in a honeycomb-like pattern. Depending on the product portfolio to be stored and the dimensions and shape of the total floor plan the desired combination of multiple modules can be made.

The modular design of the present invention is advantageous for its scalability. The present invention also provides for a high storage density and high flexibility. Depending on the number of modules and robots the performance speed can be achieved as desired.

To completely fill a desired floor space, it is advantageous when also half modules can be used for filling the sides of the floor space. It is conceivable that the system according to the present invention comprises multiple modules, each comprising a central column and at least six storage locations, and a number of columns with less than six storage locations at a certain vertical level (or all), in particular arranged to fill in the sides of a floor plan to be used.

The storage system may comprise a number of columns with less than 6 storage locations, in particular arranged to fill in the sides of a floor plan to be used. Floorplans available for storage are typically rectangular, although not necessarily. Along the edges of the area used with the storage system there may not be enough space to accommodate a complete column with all the storage locations according to the invention. A column with less than 6 storage locations, for example 4 or 3 storage locations, may be used to fill in the gaps. However, it is also possible to create other types of floor plans by using the present invention, such as L-shaped, T-shaped floor plans, preferably honeycomb-shaped. Since also the system according to the present invention is also scalable in height, also varying heights of a building can be taken into account.

In a preferred embodiment, the system according to the present invention comprises a first and a second horizontal support. Each storage location may comprise a first and second horizontal support. The first and second horizontal support may be of equal length, both extending from the central column. Optionally, the first horizontal support is shorter in length than the second support. In this case, the first horizontal support preferably may correspond to the length of the storage location of the system (length defined as the dimension (side) of a rectangular storage location which is perpendicular to the central column). The second horizontal support may extend from the central column further than the length of the storage location, as seen from the central column.

If applied, the first and second horizontal support may be used for mutual coupling of multiple columns with storage locations (multiple modules). The coupling is beneficial for a stable and strong construction of the storage system. This may be done in various ways. First horizontal supports and/or second horizontal supports may for example be coupled by mechanical coupling elements and/or by welding. Alternatively, applying an adhesive for mutual coupling, such as gluing, horizontal supports is possible.

Preferably, in particular for an embodiment comprising a hexagonal shaped column, the length of the second horizontal support is about 20-40% longer, preferably in the range of 25-35%, even more preferably about 30% longer than the first horizontal support. This is beneficial for a mutual coupling in between modules, since the second horizontal support may then be easily coupled to a first horizontal support of an adjacent module.

In an embodiment of the system according to the present invention comprising multiple modules, multiple columns with storage locations, at least three storage locations of adjacent columns (modules) are in mutual contact, in particular three storage locations at the same vertical level. Optionally, the corresponding first horizontal support of each of the three storage locations may be directly or indirectly mutually coupled.

In an embodiment which comprises at least three central columns, or three modules, three adjacent storage locations may be connected by a connection element. In an embodiment wherein more than three central columns are used, connecting the storage locations creates a network of coupled storage locations which provides benefits for the construction of the total system.

In a preferred embodiment, multiple first horizontal supports, in particular three first horizontal supports at the same vertical level, are in mutual contact, preferably connected by a support connection element. The support connection element may comprise a mechanical connection element.

Multiple first and/or second horizontal supports which are in the same vertical stack of storage locations may be connected by a least one vertical support.

First horizontal supports may be mutually connected at their ends (as seen from the central column), optionally by a support connection element. Preferably, two of the at least three first horizontal supports mutually enclose an angle of substantially 120 degrees, in particular each first support encloses an angle of substantially 120 degrees with an adjacent first support (of an adjacent module).

It is also conceivable that the first horizontal supports may be mutually coupled in other configurations, for example that one first horizontal support extends from a central column to a side edge of another first horizontal support (of an adjacent module). A connection may be made between an end tip of a first horizontal support and a midpoint on a side edge of a first horizontal support from the same and/or from and adjacent module. In an alternative embodiment horizontal supports can be mutually coupled by forming a Z-shaped structure.

In an alternative embodiment of the present invention, each storage location comprises a first horizontal support and a second horizontal support. Said second horizontal support preferably being longer than the first horizontal support. The horizontal supports may be mutually connected forming a Z-structure. This provides for a strong and stable construction. A first horizontal support of a first storage location can be connected to a second horizontal support of a second storage location and another first horizontal support of a third storage location can be mutually coupled. In said example, the third storage location can be connected to another central column than the first and second storage location. In particular the two first horizontal supports included in the Z-structure are preferably positioned in parallel.

It is conceivable that the first horizontal support of a first storage location and a second support of an adjacent second storage location (connected to the same central column) mutually enclose an angle in the range of 40-70 degrees, preferably substantially 60 degrees. In said Z-structure the angles within the Z comprise preferably an angle of substantially 60 degrees.

The system according to the present invention may comprise at least one additional support structures. For a stable and strong structure said additional support structure preferably comprises a triangular shape. If applied, such additional support structure may extend vertically along the length of a central column. Said additional support structure may be directly or indirectly coupled to a (first) horizontal support structure. Preferably each first horizontal support structure can be directly or indirectly connected to an additional support structure.

In a preferred embodiment adjacent modules are coupled for a strong construction. The adjacent modules may be coupled by the second horizontal support from a first module with a second horizontal support from a second module. This may be done by connecting the ends of the second horizontal support (as seen from the column) or by connecting the second horizontal supports mutually by connecting one end of a second horizontal support with a side edge of another second horizontal support. Preferably, a second horizontal support extends from the central column to a first horizontal support (which extends) from an adjacent column (module). Said second horizontal support may be connected to said first horizontal support (from an adjacent module), preferably wherein said second horizontal support and said first horizontal support enclose a mutual angle in the range of 55-65 degrees, preferably substantially 60 degrees.

It is also conceivable that within a module a first horizontal support and a second horizontal support are mutually connected. This can increase the stability of the system.

Optionally, a first horizontal support extends from the central column to a first horizontal support of an adjacent column, such that the ends (tips) of the first horizontal supports are in mutual contact, preferably wherein three first horizontal supports extend from their central column towards a point where they are in mutual contact.

The storage system may comprise at least one automated guided vehicle and/or load handling device, which is configured to move vertically in the central column and horizontally to and/or from central columns. This way different vertical levels in a central column can be reached, and different central columns can be accessed. It is possible to have both components be performed by different elements. The at least one automated guided vehicle may comprise at least two parts, a first base part which is configured for horizontal movements from and/or to the central columns and a, preferably complementary, second upper part which is configured for vertical movements in at least one central column.

The storage system according to the present invention may comprise at least four columns, a first, a second, a third and a fourth column, each having multiple sets of storage locations which are positioned vertically above each other, wherein each set of storage locations seen from a top view comprises a first, second, third, fourth, fifth and a sixth storage location, wherein: the first, third and fifth storage location of the first, second and third column respectively are in mutual contact and; the second, fourth and sixth storage location of the second, fourth and third column respectively are in mutual contact. The right storage location of the first column, the bottom storage location of the second column, the left storage location of the third column and the upper storage location of the fourth column may for instance share a common upward support. In such configuration the honeycomb shaped modules fit efficiently into each other to provide an efficient floor usage.

The honeycomb-shaped storage system may have a void space in between storage locations, in particular when rectangular shaped storage locations are used. This may be perceived as a downside of the honeycomb-shape. However, this void space has several benefits. Due to the shape the storage system comprises a strong and reliable structure. In case rectangular storage locations (storage locations) are used, there may be a multifunctional space present in between storage locations. The multifunctional space may extend along the storage locations in vertical direction. The multifunctional space may be seen as a void space for others, but this can in fact be used very efficiently and contribute to a more efficient use of floor-space. The multifunctional space may hold or provide accommodation for several elements which are placed outside of the storage system in conventional storage systems.

For example, the multifunctional space may be provided with an integrated sprinkler system and/or a control system for controlling operation of at least part of said storage system. Often, these kind of sprinkler systems are mandatory and prescribed by law or local regulations. The multifunctional space does not require additional floor space compared to the storage system according to the present invention. Integrating a sprinkler system into the multifunctional space, integrates the sprinkler system within the floor space used by the storage system instead of the need of additional floor space. This reduces the total floor space needed for a safe operation of the storage system according to the present invention. Integrating a sprinkler system within a storage system according to the present invention further has the benefit that also lower and middle positioned storage locations can be easily reached by the sprinkler system. This increases the safety of the storage system. This may result in a higher allowable stacking height of storage locations, and as such a more efficient use of floor space. A higher storage location density may be possible.

The present invention also relates to an assembly of at least two storage systems according to the present invention. Each storage location in the storage system of said assembly may comprise a first and a second horizontal support, wherein optionally the first horizontal support is shorter in length than the second support. Preferably at least one first horizontal support of a first storage system is mechanically connected to at least one second horizontal support of a second storage system. Preferably, the first horizontal support and the second horizontal support mutually enclose an angle in the range of 55-65 degrees, preferably about 60 degrees.

The advantages of the assembly according to the present invention are similar to the advantages of the system according to the present invention as described above.

The invention further relates to an assembly of at least a storage system according to the present invention and a racking, wherein the racking comprises vertical racking elements and a top frame connecting at least two, in particular all, vertical racking elements wherein the vertical racking elements are configured for placement on a storage floor;

and wherein the storage system is attached to the racking, and at least to the top frame, such that there is free space in between the floor and the storage system.

This racking has the advantage the modules can be assembled from top to bottom. It is up to the user to choose the amount of vertical levels comprising storage locations are needed. The free space in between the floor and the storage system is advantageous because it allows automated guided vehicles or the like to move more efficiently from one central column to the other. The only obstacles to avoid are the vertical racking elements of the racking. The automated guided vehicles or the like can move freely and/or linearly over diagonal and horizontal lines or a combination thereof. An efficient and effective use of automated guided vehicles increases the effectiveness of the system and decreases costs. The programming and operating speed of the automated guided vehicles can also be improved due to the free space.

It is also conceivable that such racking, comprising vertical racking elements and a top frame connecting at least two, in particular all vertical racking elements, is compatible with other types of storage systems. The advantages of effective use of automated guided vehicles also apply in this case.

The invention will be further elucidated hereinafter on the basis of the non-limitative exemplary embodiments in the following clauses:

1. Storage system, in particular an automatic storage and retrieval system, comprising:
   a central column, extending in a substantial vertical direction, comprising multiple vertical levels;
   a set of at least six storage locations, in particular six storage locations, each of the storage locations extending in a substantial horizontal direction at the same vertical level with respect to the central column;
   wherein the storage locations are pair-wise arranged on opposite sides of the column;
   wherein the column is substantially polygonal, in particular hexagonal or rectangular, wherein at least four storage locations at the same vertical level extend from one of the sides of the polygon.
2. Storage system according to clause 1, wherein the column comprises at least three, preferably at least four, even more preferably at least six, uprights, in the corners of the column, to support the central column, wherein preferably the system comprises multiple uprights to support the storage locations.
3. Storage system according to any of the preceding clauses, wherein the central column comprises at least one vertical track for allowing robots to travel in vertical direction in the central column, wherein preferably the track is provided on at least one uprights.
4. Storage system according to any of the preceding clauses, wherein multiple sets of at least six storage locations are present on different vertical levels of the central column, wherein preferably along a vertical line multiple storage locations are present, one above the other, which storage locations are accessible from the central column by going upward or downward in that column.
5. According to clause 4, wherein all storage locations are directly accessible from the central column.
6. According to any of the clauses 1-4, wherein at least one of the storage locations is indirectly accessible from the central column.
7. Storage system according to clause 6, wherein at least one pair of storage locations of a set of storage locations are not adjacent to the central column.
8. Storage system according to any of the preceding clauses, wherein each of the storage locations and optionally the column have substantially the same size or floor plan.
9. Storage system according to any of the preceding clauses, wherein a bottom and/or top level of the central column is free from storage locations, to allow robotic vehicles to pass and/or for at least part of the robotic vehicle to enter the central column.
10. Storage system according to any of the preceding clauses, wherein each of the storage locations comprises a horizontal support, for supporting a crate or container or tray or box, for instance formed by lips or angle iron, preferably arranged on two sides of the storage location.
11. Storage system according to any of the preceding clauses, wherein from a top or bottom view the central column and the storage locations together are substantially honeycomb-shaped.

12. Storage system according to any of the clauses 1-10, wherein from a top or bottom view the central column and the storage locations together are substantially elongated plus-shaped.
13. Storage system according to any of the preceding clauses, comprising multiple columns, each provided with a set of at least six storage locations.
14. Storage system according to clause 13, wherein multiple columns are positioned substantially next to each other and preferably positioned on a grid or in a grid-like pattern and in particular wherein at least part of the storage locations is adjacent to a storage location of an adjacent column.
15. Storage system according to any of the previous clauses, comprising multiple columns and a number of columns with less than six storage locations at a certain vertical level, in particular arranged to fill in the sides of a floor plan to be used.
16. Storage system according to any of the clauses 13-15, wherein multiple columns are positioned substantially next to each other and preferably positioned on a honeycomb or in a honeycomb-like pattern.
17. Storage system according to any of the preceding clauses, wherein each of the storage locations comprises a first and a second horizontal support, wherein the first horizontal support is shorter in length than the second support.
18. Storage system according to any of the clauses 16 or 17, wherein at least three storage locations of adjacent columns are in mutual contact, in particular three storage locations at the same vertical level.
19. Storage system according to any of the clauses 15-18, comprising at least three central columns, wherein three adjacent storage locations are connected by a connection element.
20. Storage system according to any of the clauses 17-18, wherein three first horizontal supports, in particular three first horizontal supports at the same vertical level, are in mutual contact, preferably connected by a support connection element.
21. Storage system according to clause 20, wherein two of the at least three first horizontal supports mutually enclose an angle of substantially 120 degrees, in particular each first support encloses an angle of substantially 120 degrees with an adjacent first support.
22. Storage system according to any of the clauses 17-21, wherein a second horizontal support extends from the central column to a first horizontal support from an adjacent column, and wherein said second horizontal support is connected to said first horizontal support, preferably wherein said second horizontal support and said first horizontal support enclose a mutual angle in the range of 55-65 degrees, preferably substantially 60 degrees.
23. Storage system according to any of the clauses 17-22, wherein a first horizontal support extends from the central column to a first horizontal support of an adjacent column, such that the tips of the first horizontal supports are in mutual contact, preferably wherein three first horizontal supports extend from their central column towards a point where they are in mutual contact.
24. Storage system according to any of the clauses 13-23, comprising at least one automated guided vehicle which is configured to move vertically in the central column and horizontally to and/or from central columns.
25. Storage system according to clause 24, wherein the at least one automated guided vehicle comprises at least two parts, a first base part which is configured for horizontal movements from and/or to the central columns and a, preferably complementary, second upper part which is configured for vertical movements in at least one central column.
26. Storage system according to any of the preceding clauses, comprising at least four columns, a first, a second, a third and a fourth column, each having multiple sets of storage locations which are positioned vertically above each other, wherein each set of storage locations seen from a top view comprises a first, second, third, fourth, fifth and a sixth storage location, wherein:
    - the first, third and fifth storage location of the first, second and third column respectively are in mutual contact and;
    - the second, fourth and sixth storage location of the second, fourth and third column respectively are in mutual contact.
27. Storage system according to any of the preceding clauses, wherein at least one of the storage locations comprises multiple storage locations, arranged behind each other or next to each other as seen from the central column.
28. Storage system according to any of the preceding clauses, wherein in between storage locations a multifunctional space is present, which extends along the storage locations in vertical direction.
29. Storage system according to clause 28, wherein the multifunctional space is provided with an integrated sprinkler system and/or a control system for controlling operation of at least part of said storage system.
30. Assembly of at least two storage systems according to any of the clauses 10-29, wherein at least one first horizontal support of a first storage system is mechanically connected to at least one second horizontal support of a second storage system, preferably wherein the first horizontal support and the second horizontal support mutually enclose an angle in the range of 55-65 degrees, preferably about 60 degrees.

BRIEF DESCRIPTION OF THE FIGURES

The invention will be elucidated on the basis of non-limitative exemplary embodiments shown in the following figures, wherein.

DESCRIPTION OF THE INVENTION

Figure 1A:
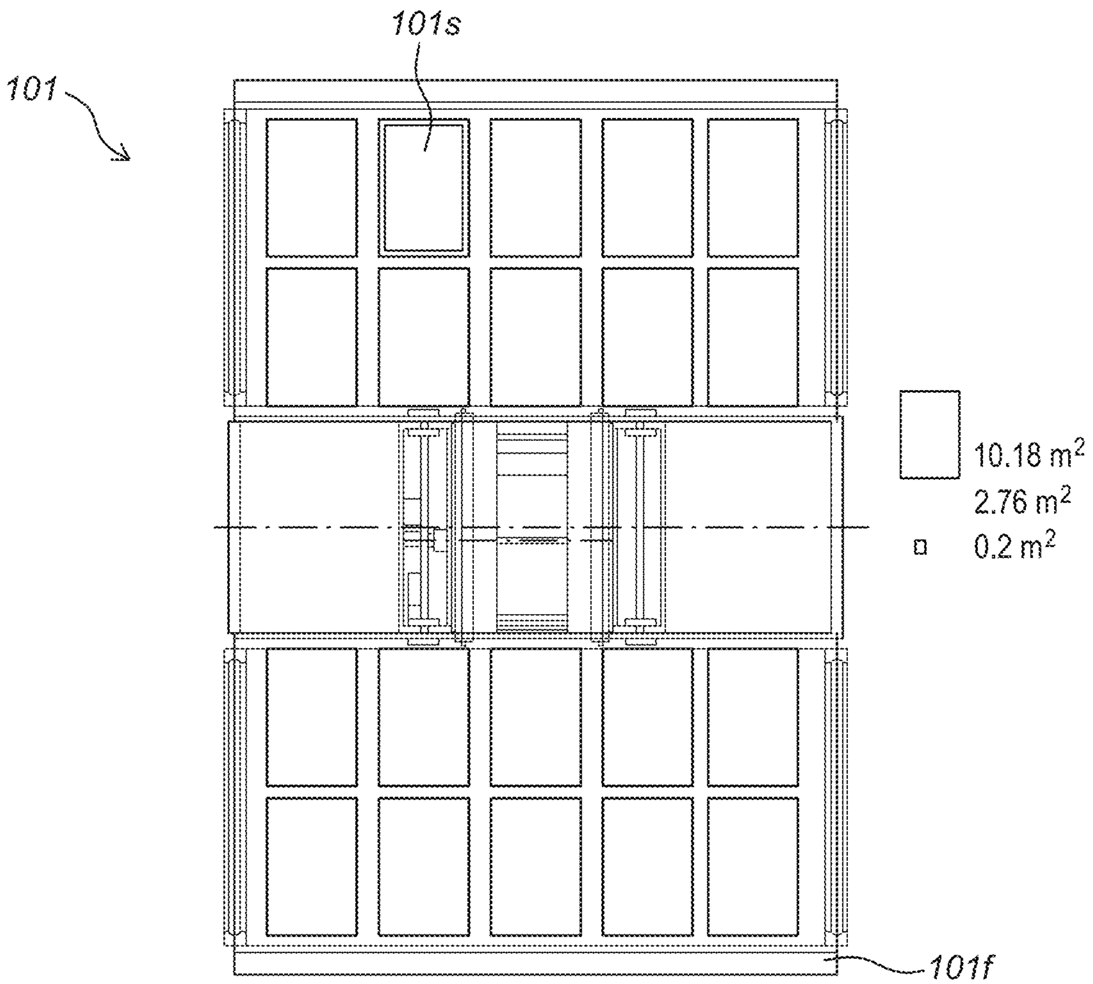
FIGS. 1a,1b,1c,1d, and 1e schematically show a storage location comparison between various embodiments of the storage system according to the present invention and currently known state of the art solution.
Figure 1B:
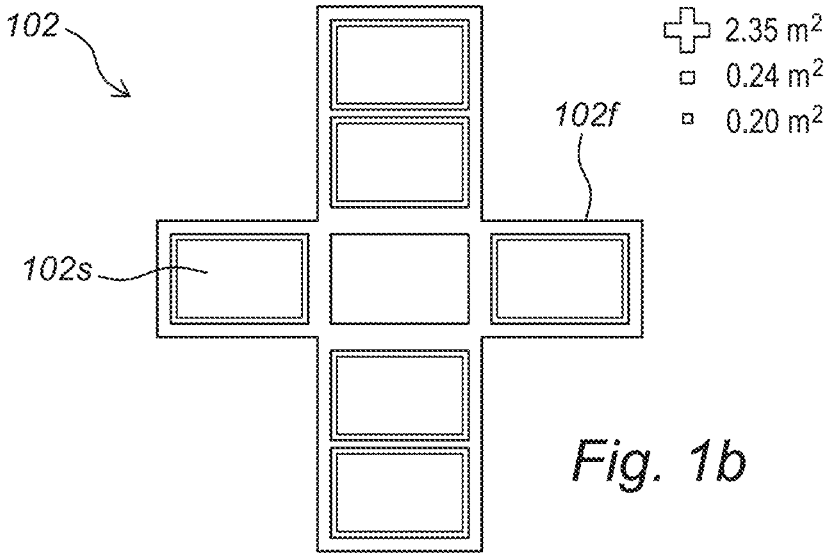
Figure 1C:
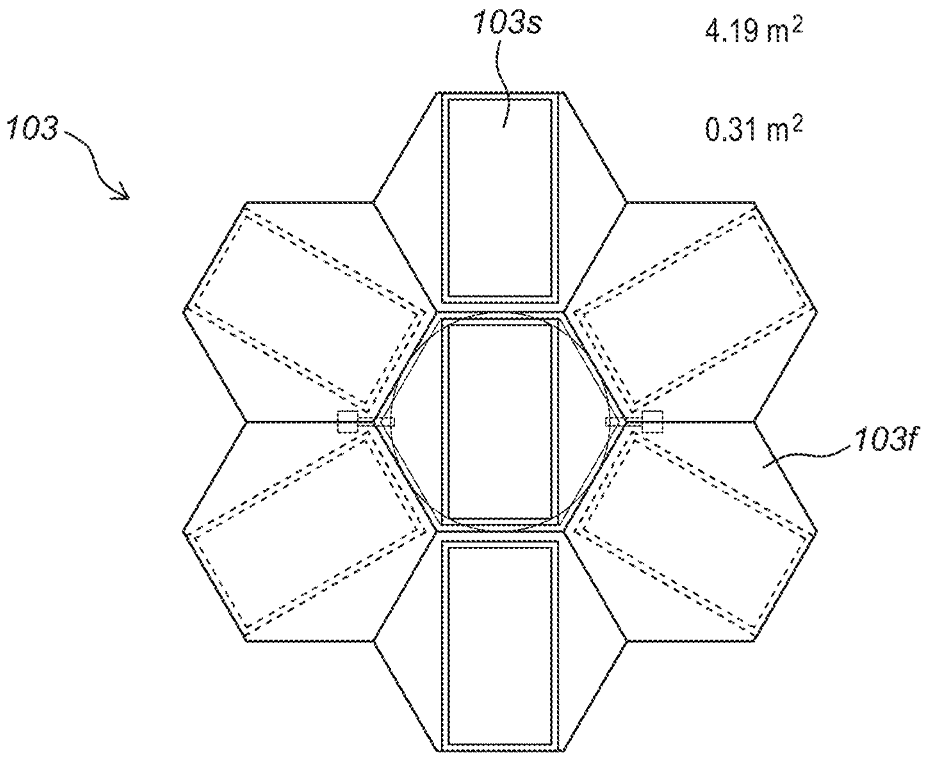

FIG. 1*a* schematically shows a floor plan of a shuttle system 101 according to the state of the art. FIG. 1*b* shows a floorplan of an elongated plus shaped system 102 according to the present invention. FIG. 1*c* shows a floorplan of a honeycomb shaped system 103 according to the present invention. Besides the figures an indication is given of the amount of floor space f that is needed for said system, which is indicated by 101*f*, 102*f* and 103*f* respectively. Also the amount of storage space needed, (for the storage locations), is indicated by the storage locations 101*s*, 102*s* and 103*s* respectively. The total storage space can be calculated by multiplying the indicated storage space needed for one storage location by the amount of storage locations. An overview of possible embodiments is presented in below table as well. It may be obvious that below dimensions are exemplary embodiments. Specific sizes may vary.

| System | Total storage space | Total floor space | Storage space:floor space ratio |
|---|---|---|---|
| Shuttle system (FIG. 1a) | 4.0 $m^2$ | 10.18 $m^2$ | 1:2.55 |
| Elongated plus system (FIG. 1b) | 1.20 $m^2$ | 2.35 $m^2$ | 1:1.96 |
| Honeycomb system (FIG. 1c) | 1.86 $m^2$ | 4.19 $m^2$ | 1:2.25 |
| Optimized honeycomb system (FIG. 1d) | 1.524 $m^2$ | 2.79 $m^2$ | 1:1.83 |

Figure 1D:
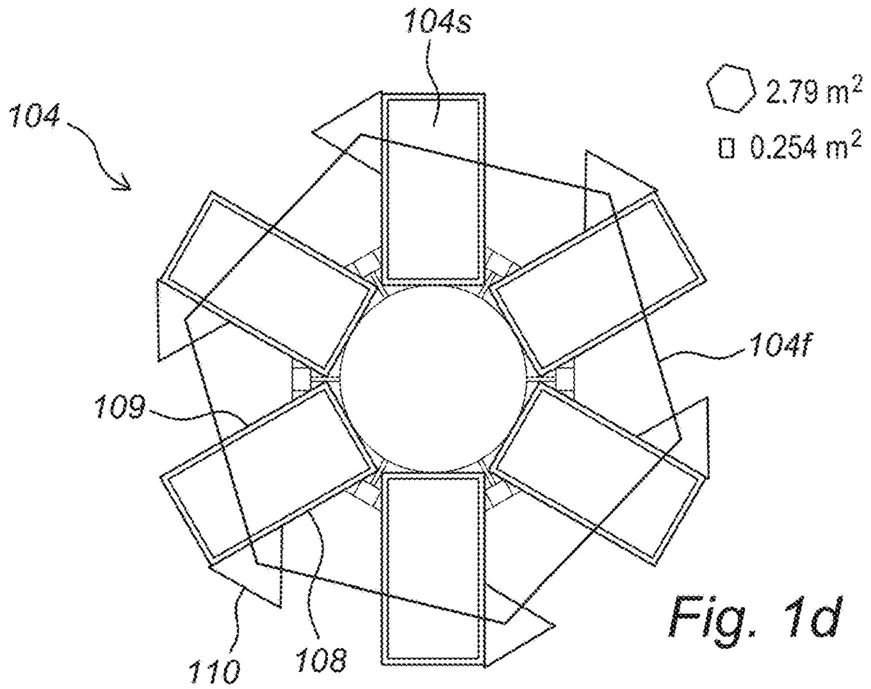
Figure 1E:
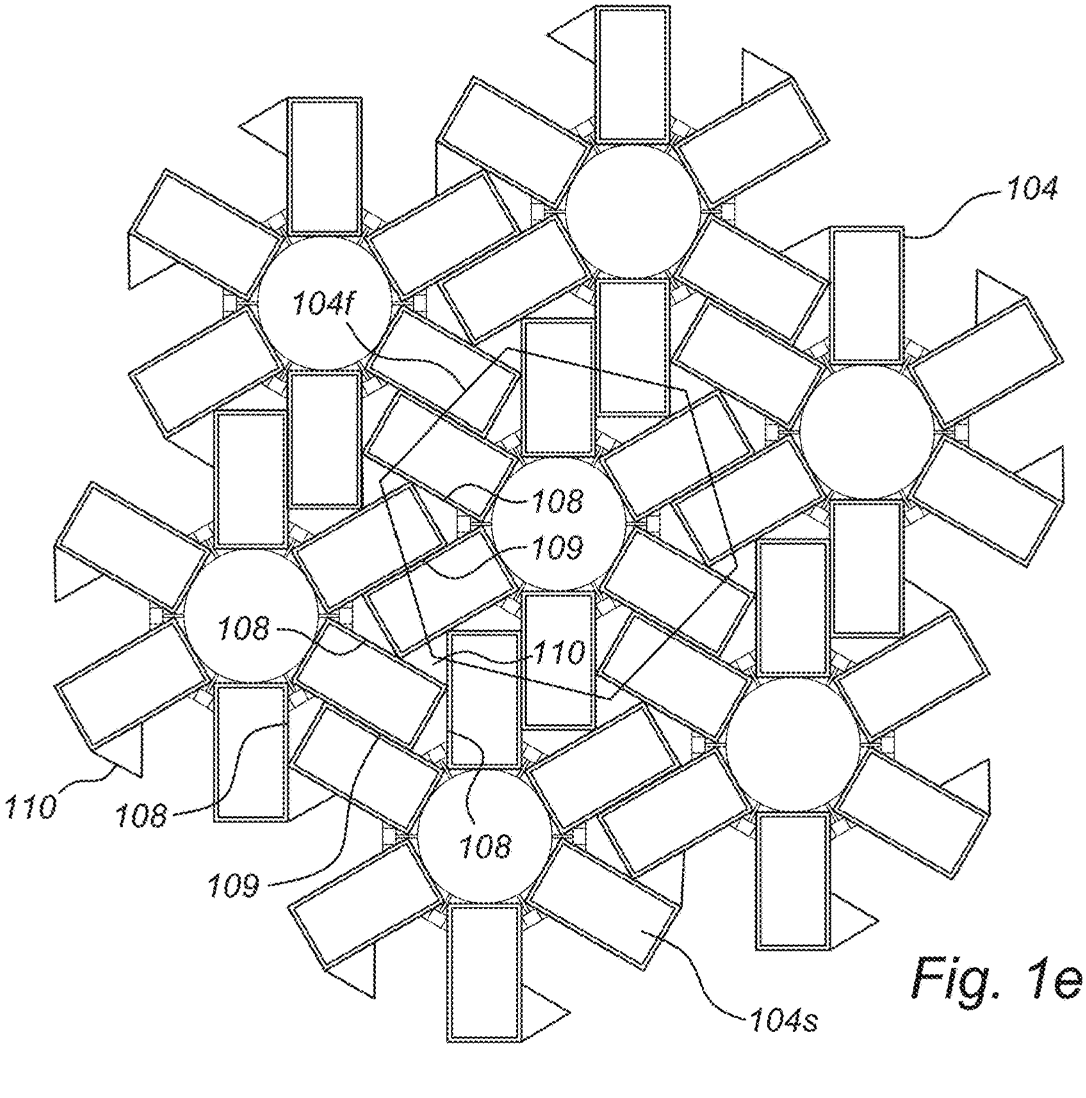

These figures and above mentioned table show that in a first embodiment (elongated plus) for 1 square meter of storage space 1.96 square meter of floor space is needed and that in a second embodiment (honeycomb) for 1 square meter of storage space 2.25 square meter of floor space is needed. The solutions according to the invention are more efficient in terms of floor space. The difference may seem small, but on warehouse areas of 10.000 $m^2$ and several levels high, this improvement has a big impact. The solution according to the invention also allows vertical space to be used optimally and efficiently. The system according to FIGS. 1*b-d* are in particular advantageous for a good floor space to storage space ratio. The embodiment and floor plan of FIG. 1*b*. is further described in FIGS. 2 and 3.

The system according to the present invention of FIGS. 1*c* and 1 *d* use more floor space, but has another beneficial use of floor space, namely that in the marked area 8 in between storage spaces, in between storage locations 1,2,3,4,5,6, there is space for sprinkler installations or other electrical equipment such as a control unit. In the other systems from FIGS. 1*a* and 1*b* these kind of equipment is also necessary, but needs to be placed outside of the floor space as presented. This would deteriorate their storage space:floor space ratio. The embodiment and floor plan of FIG. 1*c*. is further described in FIGS. 4 and 5.

FIGS. 1*d* and 1 *e* show an alternative embodiment 104, comprising six storage locations 104*s* extending from a central column. FIG. 1*e* shows that multiple modules as shown in FIG. 1*d* are intertwined when they are combined into a system comprising multiple columns. The floor space 104*f* is indicated in FIGS. 1*d* and 1*e*. Each storage location 104*s* comprises a first horizontal support 108 and a second horizontal support 109. Two first horizontal supports 108 and one second horizontal support 109 form a Z-shaped structure. Also additional triangular support structures 110 are shown.

Figure 2:
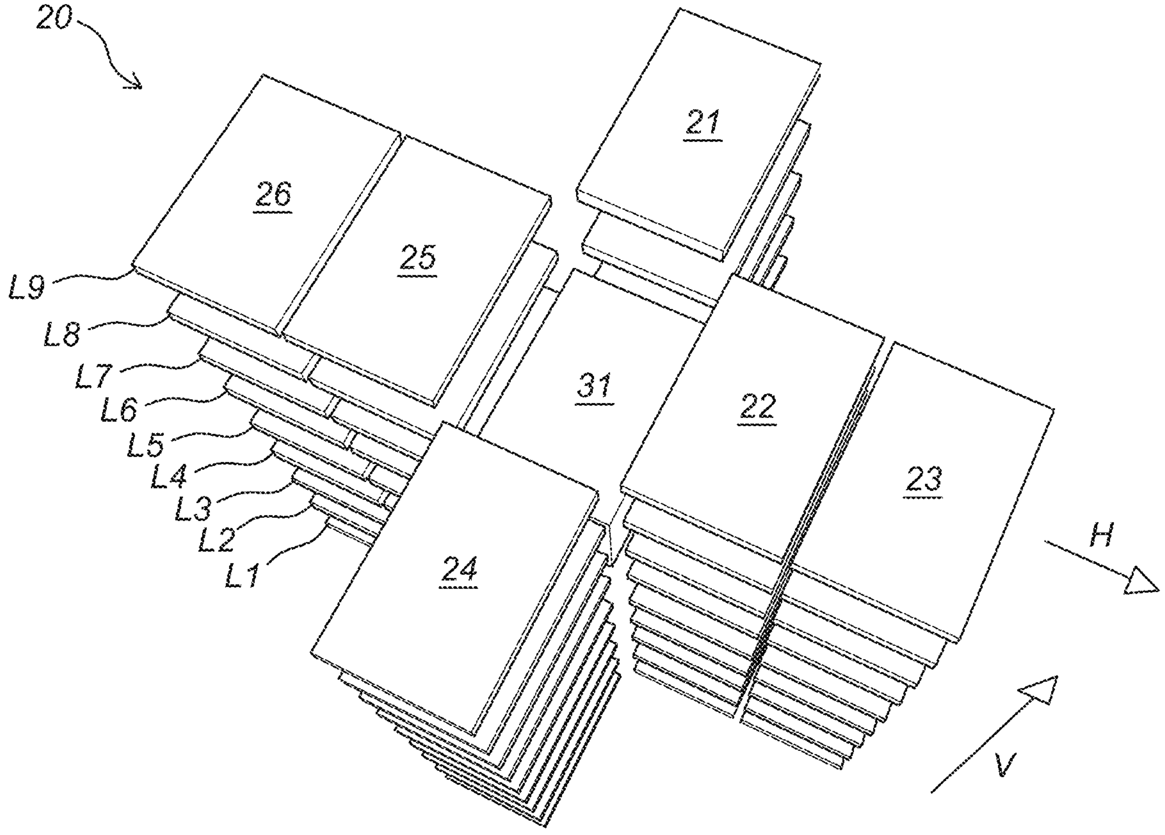
FIG. 2 shows a perspective view on an embodiment of a module according to the present invention.

FIG. 2 shows a schematic perspective view of an embodiment of one module according to the present invention. The module 20 shown comprises a rectangular central column 31 which extends in a vertical direction (V). Along the central column 31 at several vertical storage levels L1, L2, L3, L4, L5, L6, L7, L8, L9, storage locations 21, 22, 23, 24, 25, 26 are present. Each storage level L1, L2, L3, L4, L5, L6, L7, L8, L9 comprises six storage locations 21,22,23,24,25,26. Each storage location extends in a horizontal direction from the central column. The storage locations are pairwise arranged on opposite sides of the central column 31 in pairs 21-24, 22-25, 23-26. In the shown embodiment, one pair of storage locations is positioned 'double deep' 23-26, and these storage locations 23,26 are accessible only through the storage location 22,25 in between the central column 31 and the double deeply positioned storage location 23,26 respectively. These double deep storage locations 23, 26 can be used for slowmover products. The double-deep storage locations 23, 26 are positioned such that the longer side of the rectangular shaped storage location is adjacent to the longer side of the rectangular central column 31. The pair of single deep storage locations 21, 24 is adjacent to the central column at the shorter side of the storage location 21, 24 and shorter side of the rectangular central column 31. This is a preferred configuration, since it provides for a short gap between the central column and the double deep storage location 23,26. This shortens the time to reach the storage location and thus the time to store and/or retrieve goods from the storage location.

Figure 3:
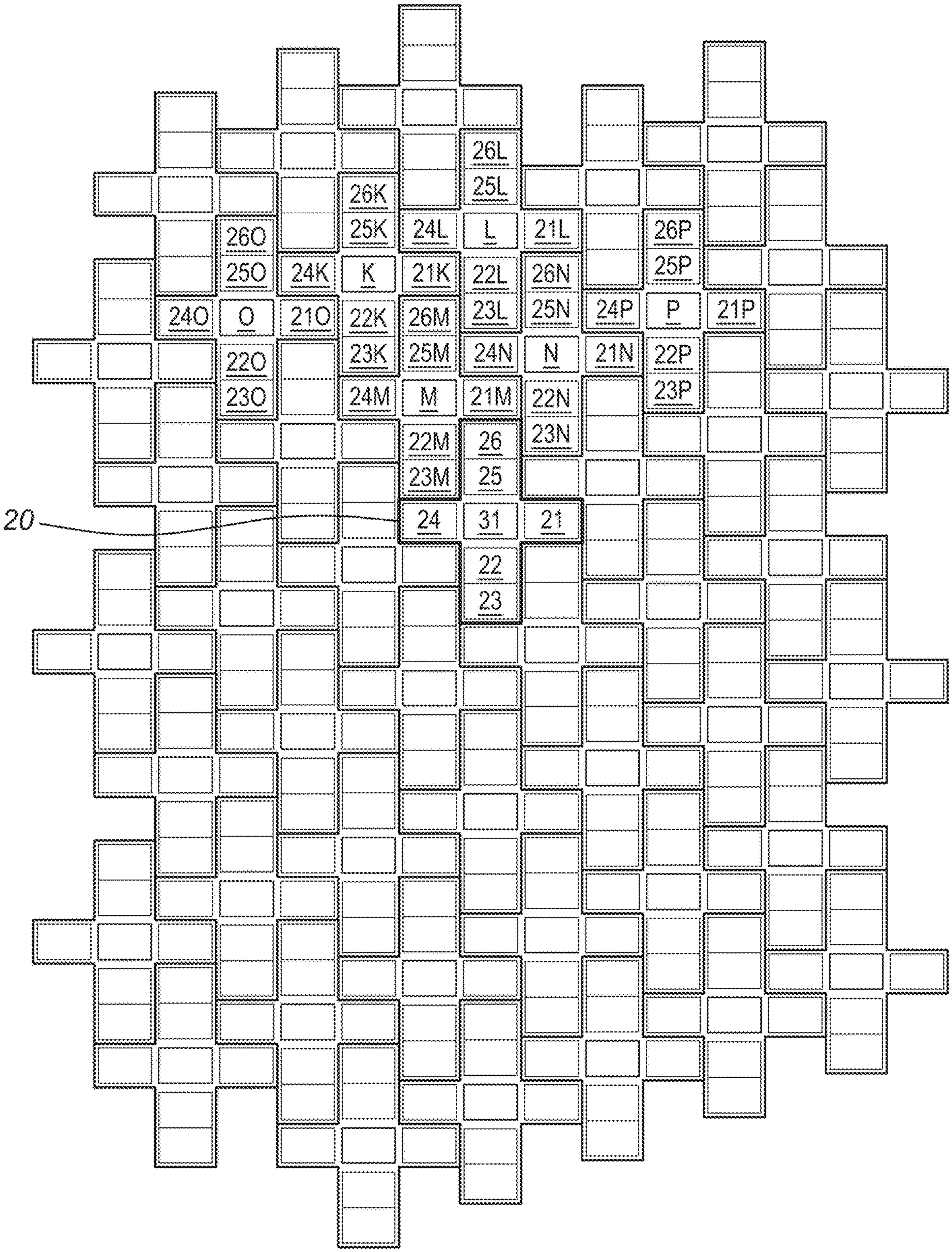
FIG. 3 schematically shows an embodiment of a floor plan of a system according to the present invention comprising multiple modules according to FIG. 2.

FIG. 3 schematically shows a top view of a floor plan of an embodiment of a storage system comprising multiple modules (as shown in FIG. 2) according to the invention. The embodiment shown comprises multiple central columns with storage locations (modules). The modules are placed in a grid-like pattern. One module 20 is shown with similar reference numbers as in FIG. 2. Showing a central column 31, and six horizontal extending storage locations 21,22,23,24,25,26. The storage locations of one module are (directly) adjacent to storage locations of adjacent modules. This enhances the storage space to floor space ratio.

For illustrative purposes six additional modules are provided with reference signs. The central columns of each module are indicated with a letter K, L, M, N, O, P with corresponding storage locations 21*k*, 22*k*, 23*k*, 24*k*, 25*k*, 26*k*, 21*l*, 22*l*, 23*l*, 24*l*, 25*l*, 26*l*, 21*m*, 22*m*, 23*m*, 24*m*, 25*m*, 26*m*, 21*n*, 22*n*, 23*n*, 24*n*, 25*n*, 26*n*, 21*o*, 22*o*, 23*o*, 24*o*, 25*o*, 26*o* and 21*p*, 22*p*, 23*p*, 24*p*, 25*p*, 26 respectively. Each storage location is adjacent to storage location of an adjacent module. For example, storage location 21*m* is adjacent to three storage locations of two adjacent modules. The storage locations of module corresponding to central column N and of module 20. Storage location 21*m* is adjacent to storage locations 24*n* and 22*n* and also adjacent to storage location indicated with 26. In the shown embodiment a storage location can be adjacent to either the central column of that module or to another storage location within the module. For example, double deep storage location 26*m* is adjacent to storage location 25_m_ within their module M. Storage location 25_m_ is adjacent to the central column M of the module M.

The shape of the central columns 31, K, L, M, N, O, P is similar to the rectangular shape of the storage locations. The storage locations are rectangular and dimensioned with a 3:2 ratio between the longer and shorter sides.

Not shown is that partial modules can optionally be used to fill in the sides of the floor plan to match the size of a specific floor space.

Figure 4:
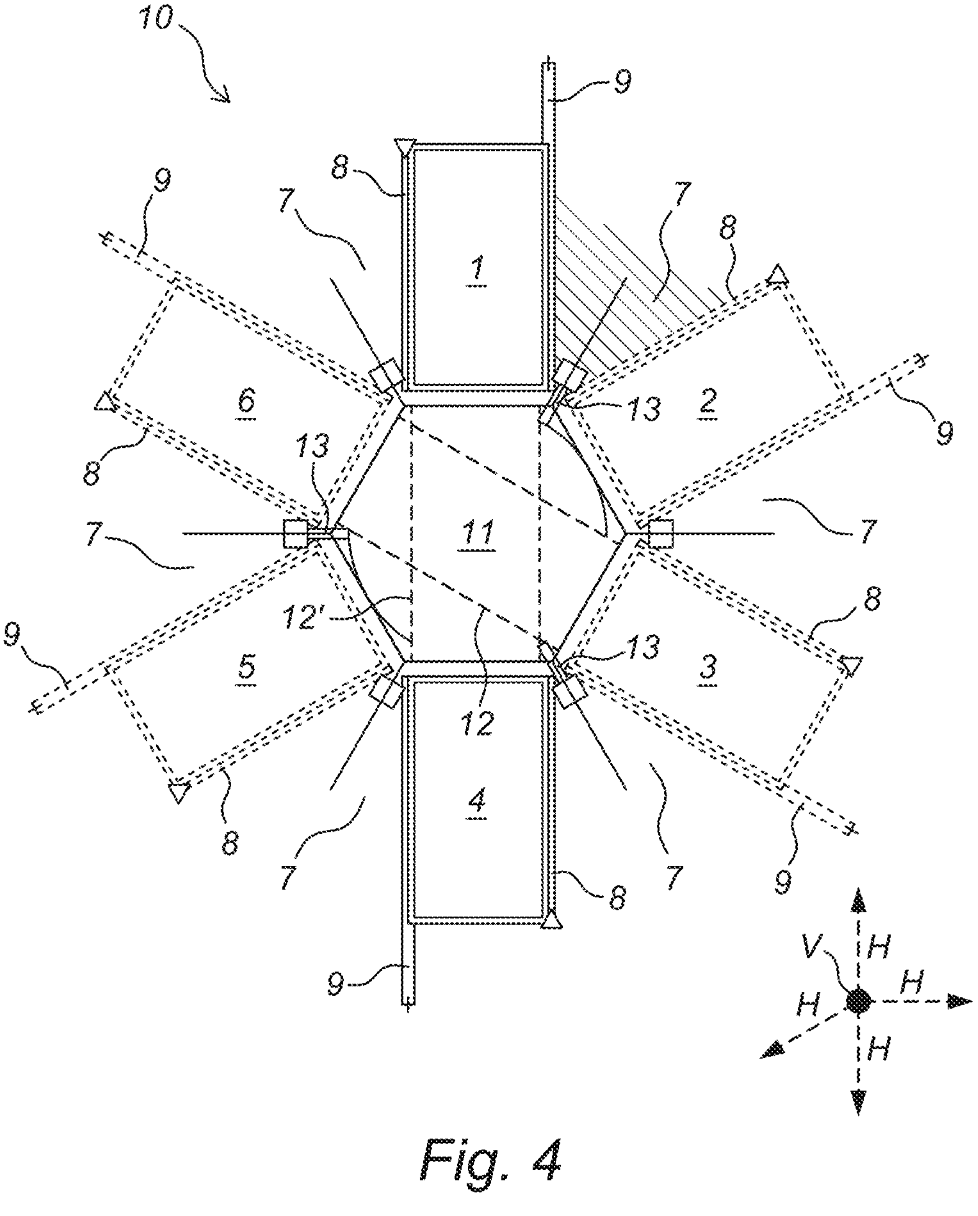
FIG. 4 schematically shows a floor plan of an embodiment of a module according to the present invention.

FIG. 4 shows an embodiment of a floor plan of a storage system 10 according to the present invention. The FIG. 4 shows one module comprising a hexagonal central column. The storage system 10 comprises a central column 11. Said column 11 extends in a vertical direction (V), which is out of the paper in the presentation in this figure. The shown embodiment comprises six storage locations 1,2,3,4,5,6 which extend in a substantial horizontal direction (H) which is perpendicular to the vertical direction (V). The storage locations 1,2,3,4,5,6 extend from the column 11 in a horizontal direction. The six storage locations 1,2,3,4,5,6 are pair-wise arranged on opposite sides of the column 11, 1-4,2-5,3-6. The storage locations 1,2,3,4,5,6 have a rectangular shape and are substantially identical in surface size. The column 11 is hexagonal shaped. From each side of the hexagon a storage location 1,2,3,4,5,6 extends. In the central column 11 a robot may move up and down. In the shown embodiment the robot will take its position with respect to the storage locations below or on top of the column 11, for an optimal use of floor space. Typically each storage location is used for the storage of a storage rack (or box or crate). Due to the hexagonal shape of the central column 11 the robot is then not able to rotate within the column 11 while carrying a storage rack which shape corresponds to a storage location 1,2,3,4,5,6. For this purpose three different orientations are possible. Two of them are shown in the figure, these are indicated with dashed lines 12, 12'. In the shown embodiment a multifunctional space 7 is present in between storage locations 1,2,3,4,5,6. This space is marked in between storage locations 1,2. This void area 7 can be used for a sprinkler installation.

Each of the storage locations 1,2,3,4,5,6 comprise a first horizontal support 8 and a second horizontal support 9. In the embodiment shown, the first horizontal supports 8 are shorter in length than the second horizontal supports 9.

In the figure it is visible that the length of each storage location 1,2,3,4,5,6 corresponds to the length in between opposite side edges of the column 11. For example, corresponding to the length of a position of a load handling device with dashed line 12.

The central column 11 comprises three vertical supports 13. The vertical supports 13 may be provided with a track suitable for a (climbing) robot.

Figure 5:
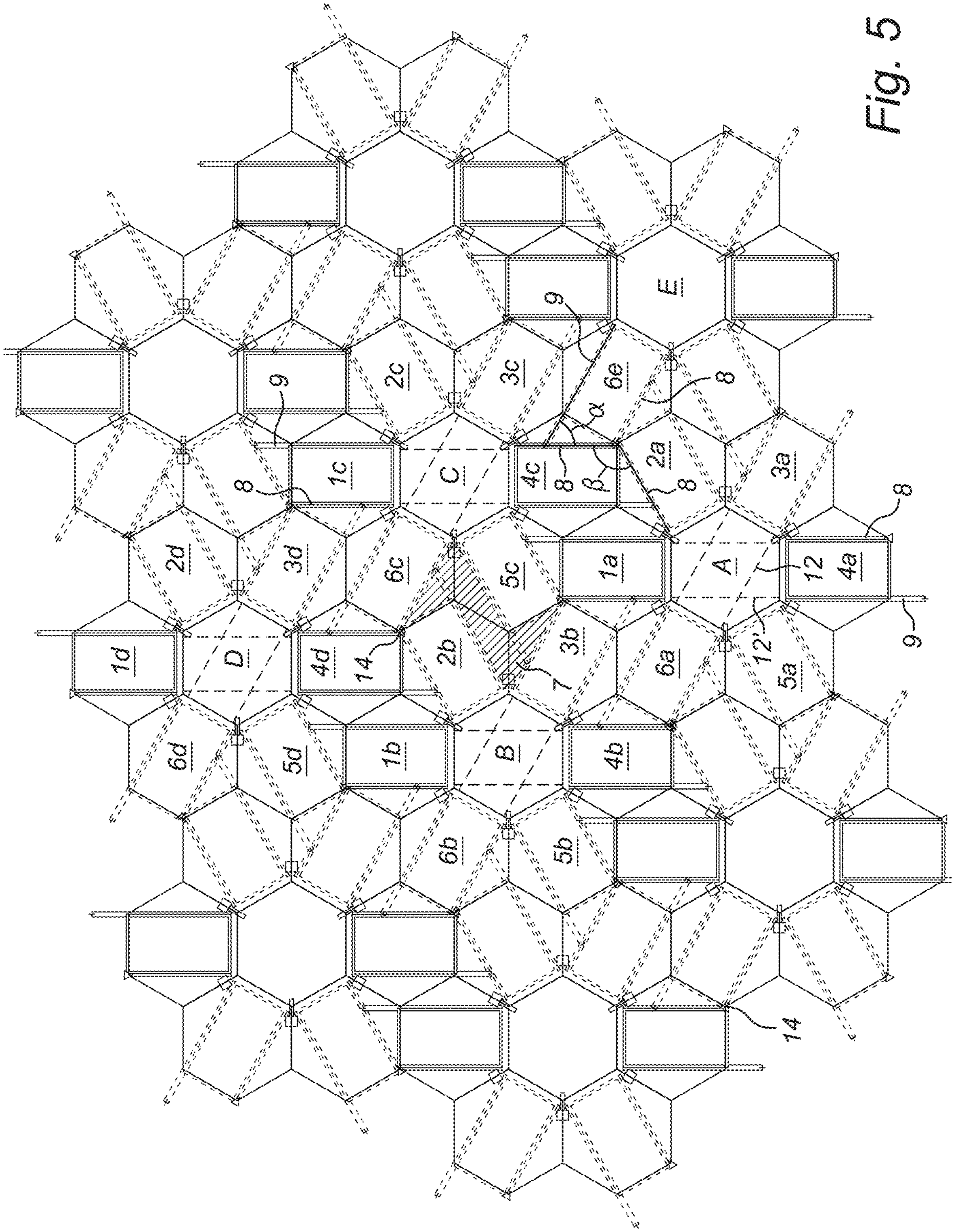
FIG. 5 schematically shows another embodiment of a floor plan of a system according to the present invention comprising multiple modules according to FIG. 4.

FIG. 5 schematically shows a floor plan of an embodiment of a storage system comprising multiple modules (as shown in FIG. 4) according to the invention. The embodiment shown comprises multiple central columns with storage locations (modules). The central columns (A, B, C, D, E) in the grid are placed along/in a honeycomb-shaped grid. These columns A, B, C, D, E correspond to column 11 from the previous figures. For other features, similar reference signs are used as in the previous figures to indicate similar features. Column A comprises storage locations 1_a_,2_a_,3_a_,4_a_,5_a_,6_a_. Column B comprises rectangular storage locations 1_b_,2_b_,3_b_,4_b_,5_b_,6_b_. Column C comprises storage locations 1_c_,2_c_,3_c_,4_c_,5_c_,6_c_. Column D comprises rectangular storage locations 1_d_,2_d_,3_d_,4_d_,5_d_,6_d_. Column E comprises rectangular storage locations 1_e_,2_e_,3_e_,4_e_,5_e_,6_e_.

The modules are mutually connected in several ways.

The storage system shown comprises multiple columns, of which in particular four columns, a first, a second, a third and a fourth column are indicated with A, B, C, D respectively. Each column A, B, C, D comprises multiple sets of storage locations which are positioned vertically above each other. In the figure one level is shown, showing one set of storage locations. Each set of storage locations seen from a top view comprises a first, second, third, fourth, fifth and a sixth storage location. The first, third and fifth storage location of the first, second and third column respectively are in mutual contact: storage location 1_a_,3_b_,5_c_ are in mutual contact. Also, the second, fourth and sixth storage location of the second, fourth and third column respectively are in mutual contact: storage location 2_b_,4_d_,6_c_ are in mutual contact. Preferably these adjacent storage locations are mutually coupled by a connection element 14. The storage locations are typically connected at one of their corners. This may be done by connecting first horizontals supports 8.

The figure shows connection elements 14 in between three adjacent storage locations. Said storage locations mutually enclose an angle ($\beta$) of 120 degrees. The connection elements 14 are indicated by triangles. At the side edges of the system, two storage locations may be connected by a connection element 14.

Furthermore, connection is made between the longer second horizontal support 9 and a shorter first horizontal support 8 from an adjacent module. A horizontal support 9 is 25% longer than a first horizontal support 8, to match the distance between the end of the storage location and the second horizontal support. The second horizontal support 9 extends from the central column (module) to a first horizontal support from an adjacent column (module). Said second horizontal support is connected to said first horizontal support by connecting the end of the second horizontal support 9 with a side edge of the first horizontal support 8. The said second horizontal support and said first horizontal support enclose a mutual angle ($\alpha$) in the range of 55-65 degrees, preferably substantially 60 degrees. The angle is indicated in one of the many connections shown in the figure.

The figure also shows several multifunctional space of which one of them is indicated by dashed lines and reference sign 7.

Not shown is that partial modules can be used to fill in the sides of the floor plan to match the size of a specific floor space.

Figure 6:
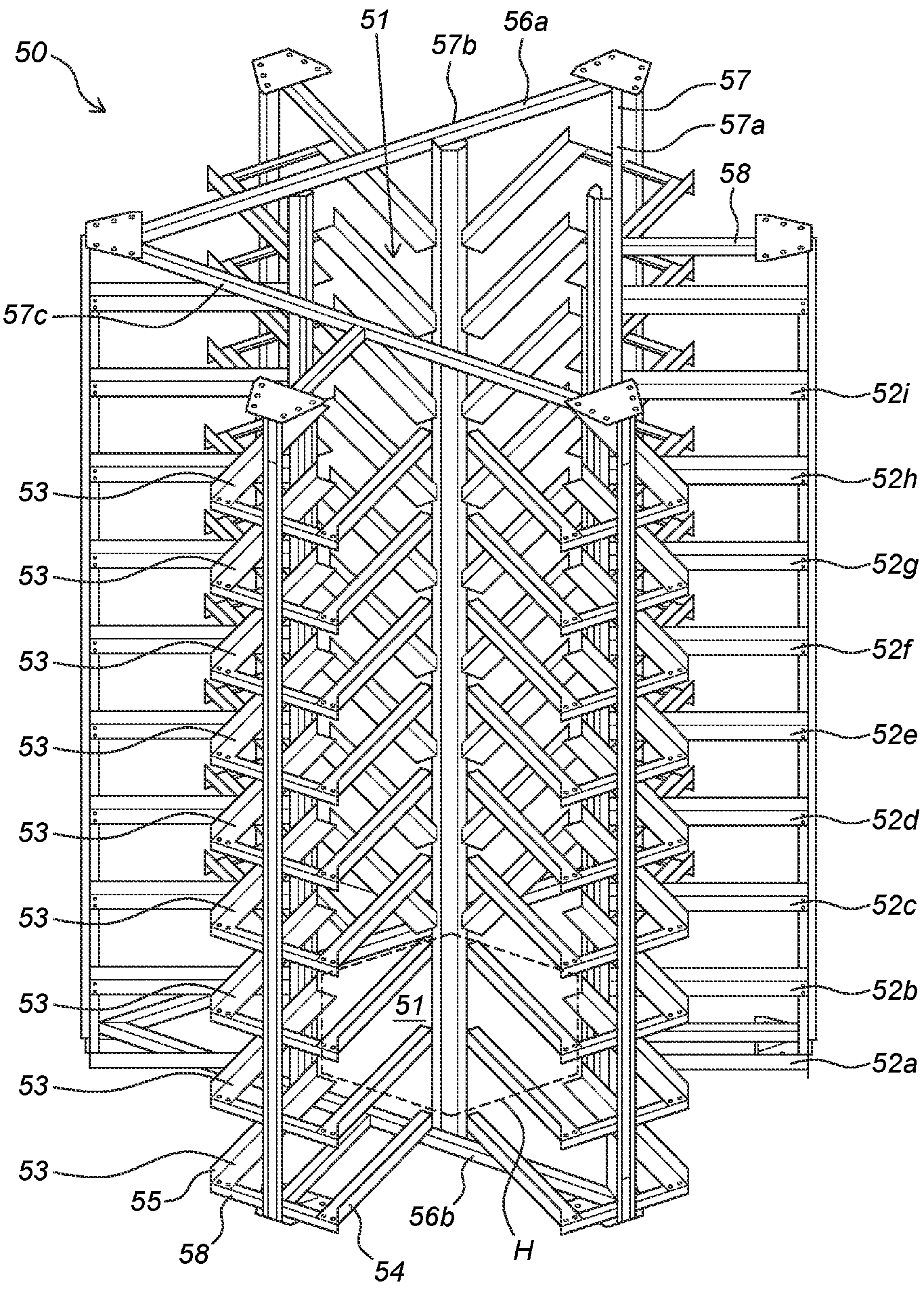
FIG. 6 schematically shows a perspective view of an embodiment of a module comprising a hexagonal column according to the present invention.

FIG. 6 shows a perspective view of part of an embodiment of a storage system according to the present invention. The figure shows one module 50 (one central column with corresponding storage locations), comprising a hexagonal central column 51 with multiple vertical levels comprising storage locations. The hexagonal central column is indicated with dashed lines (H). From the central column 51 nine vertical levels 52_a_, 52_b_, 52_c_, 52_d_, 52_e_, 52_f_, 52_g_, 52_h_, 52_i_ with storage locations are present. The storage locations 53 are defined by the horizontal supports 54, 55. This is just an example and this embodiment can also comprise more or less vertical levels. The storage locations 53 extend from the central column 51 in horizontal direction. The central column 51 comprises a hexagonal shape and from each side of said hexagonal storage location 53 extends at each vertical level 52_a_-52_i_. The storage locations 53 comprise horizontal supports 54, 55 that support a crate or the like. The storage location shown further comprises a connecting element 58 for connecting the two horizontal supports 54, 55. The connecting element 58 can be used for rigidity and for further supporting a crate or the like.

The part of the storage system shown further comprises a support frame 56 at the top and bottom of the column 51. The column is provided with six uprights 57 that extend from the upper support frame 56*a* to the lower support frame 56*b*. In the shown embodiment the upper support frame 56*a* and the lower support frame 56*b* comprise a rectangular frame 57 from which at each side 57*a*, 57*b*, 57*c* a secondary support frame element 58 extends.

Figure 7:
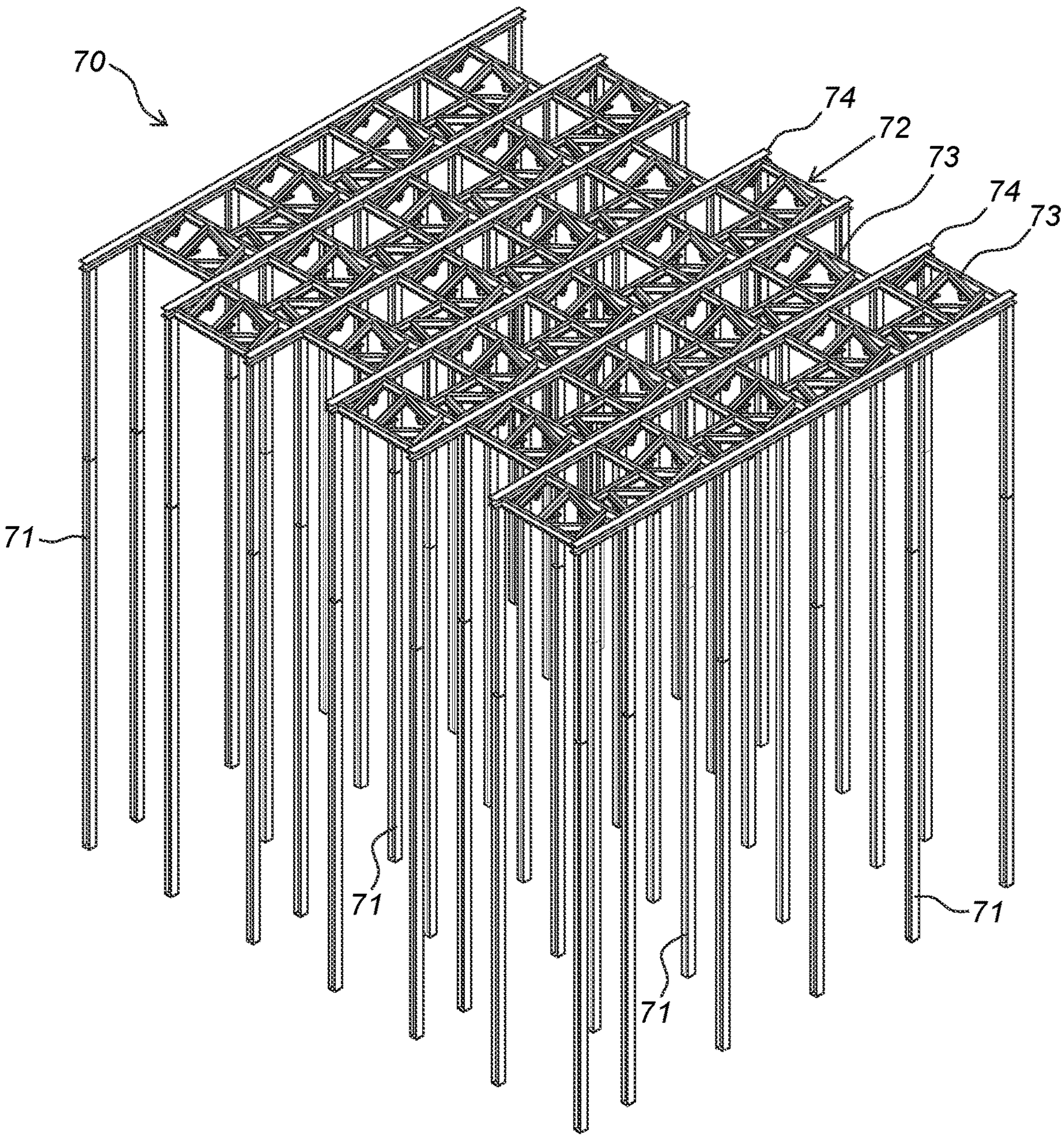
FIG. 7 schematically shows a perspective view of a racking structure.

FIG. 7 shows a racking 70 wherein multiple modules can be placed. Each module comprising one central column comprising at least six storage locations on different vertical levels of the central column, wherein preferably along a vertical line multiple storage locations are present, one above the other, which storage locations are accessible from the central column by going upward or downward in that column. The racking 70 comprises vertical racking elements 71. The racking elements 71 are connected to one another via a top frame 72. The top frame 72 comprises several shorter fame elements 73 and top bars 74 that combined mutually connect the vertical racking elements 71 in order to provide a safe and rigid racking 70.

The racking 70 allows that the bottom level of a central column is free from storage locations, to allow robotic vehicles to pass and/or for at least part of the robotic vehicle to enter the central column.

Figure 8:
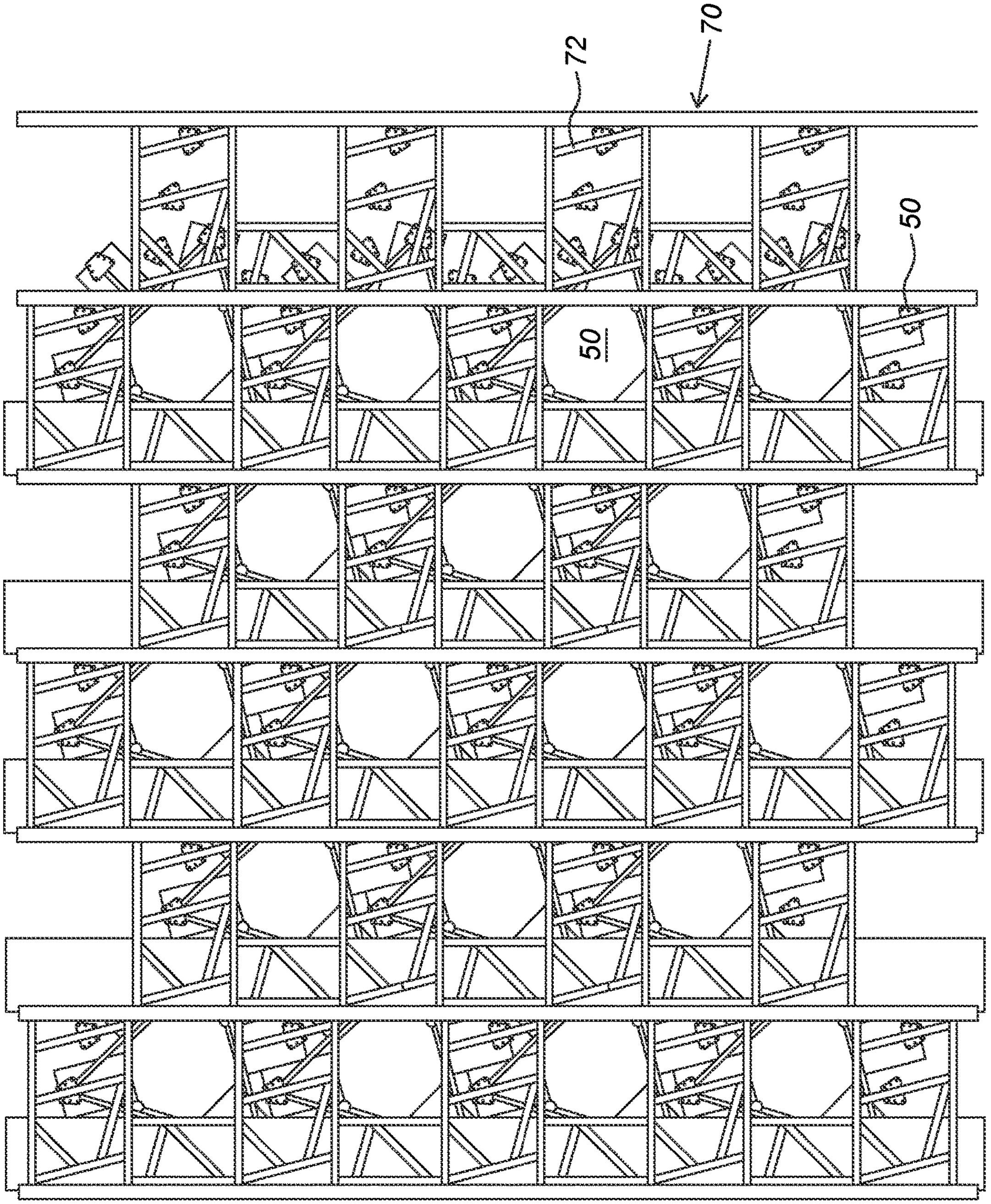
FIG. 8 schematically shows a top view of an embodiment of a racking structure in combination with an embodiment of a honeycomb shaped system.

FIG. 8 schematically shows a top view of an embodiment of a racking structure 70, as shown in FIG. 7, in combination with an embodiment of system according to the present invention shaped as a honeycomb. In FIG. 8 a combination of the racking 70 and the embodiment of a module 50 as shown in FIG. 6 is shown. The top view gives an example of how the racking of FIG. 7 can be combined with a module as shown in FIG. 6. The modules 50 can be mounted onto the top frame 72 of the frame 70.

Figure 9:
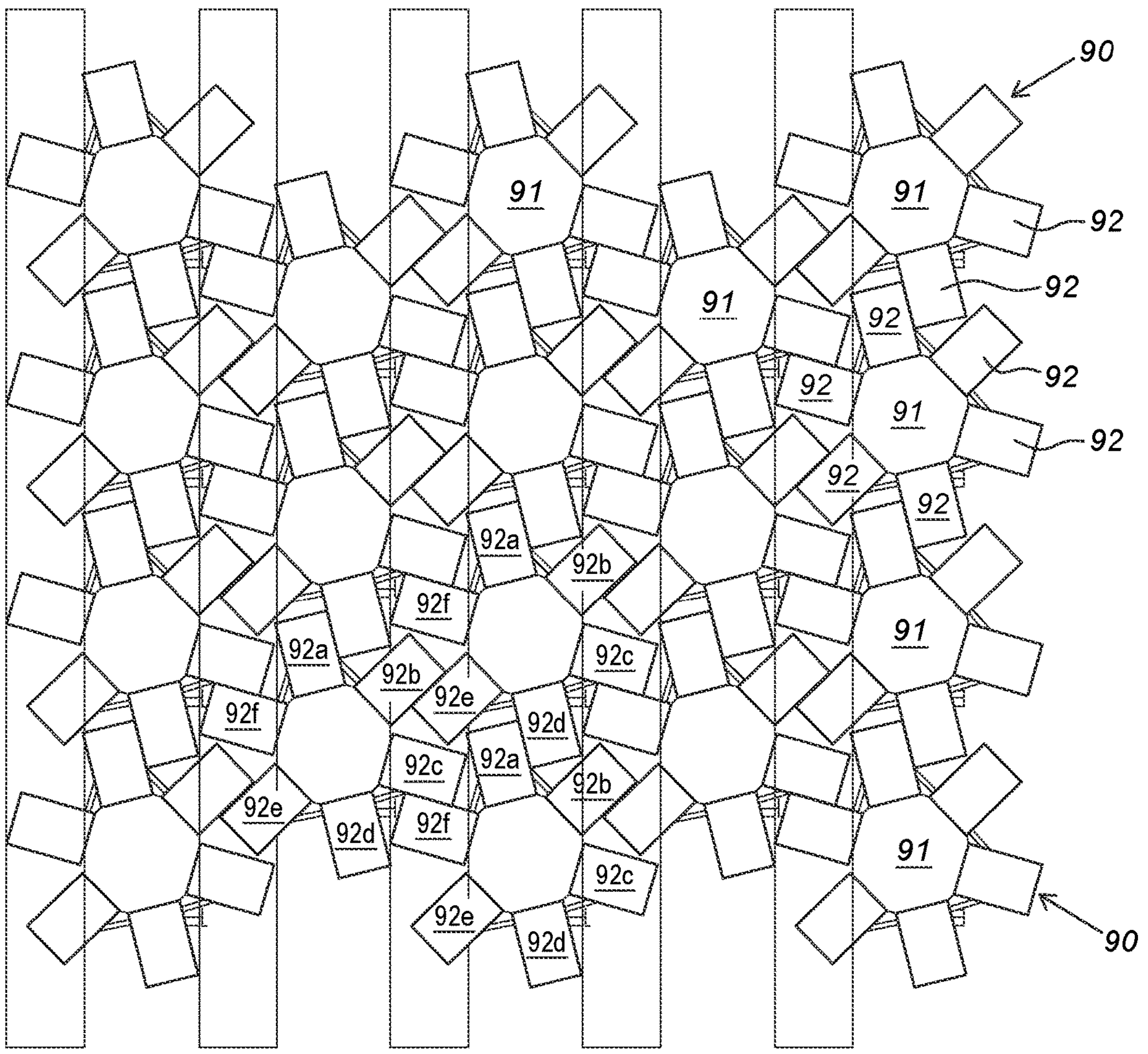
FIG. 9 schematically shows a top view of an embodiment of honeycomb shaped system, comprising honeycomb shaped modules.

FIG. 9 schematically shows a top view of an embodiment of honeycomb shaped system, comprising honeycomb shaped modules 90. A module 90, in the shown embodiment, comprises a hexagonal central column 91 and at each level six extending rectangular storage locations 92. This embodiment shown is also referred to as a hexagonal module. The figure shows how eighteen honeycomb-shaped modules comprising hexagonal central columns 91 can be used to have a very efficient ratio of storage:floor space.

The embodiment of the system 80 shown, comprises eighteen stationary central columns 91, extending in a substantial vertical direction. Each column 91 comprises multiple vertical levels, because of the top view shown the top level only is visible. Each vertical level comprises a set of six storage locations 92 that each extend in a substantial horizontal direction at the same vertical level with respect to the same central column 91. The storage locations 92 are pair-wise arranged on opposite sides of the column 91. In this embodiment there are three pairs of storage locations with a total of six pairwise arranged storage locations 92 per vertical level of each column 91. Due to the hexagonal shaped columns 91 and extending storage locations 91 therefrom, the hexagonal modules can be put very close to one another. The storage locations 91 of adjacent modules can be in partly abutting contact. This is for example shown at storage locations indicated with the reference numbers 92*a*, 92*d* and for 92*b*, 92*e*, and 92*c* and 92*f*. It is possible that the hexagonal shaped modules 90 may comprise the same structure as shown in FIG. 6. The embodiment of the hexagonal shaped central columns, as shown in this figure, facilitate an efficient use of the floor space and the embodiment shown has good properties on storage density.

It will be clear that the invention is not limited to the exemplary embodiments which are illustrated and described here, but that countless variants are possible within the framework of the attached claims, which will be obvious to the person skilled in the art. In this case, it is conceivable for different inventive concepts and/or technical measures of the above-described variant embodiments to be completely or partly combined without departing from the inventive idea described in the attached claims.

The verb 'comprise' and its conjugations as used in this patent document are understood to mean not only 'comprise', but to also include the expressions 'contain', 'substantially contain', 'formed by' and conjugations thereof.

Where in this documents reference is made to storage locations, also shelve locations, pick locations or racks are meant.

At one storage location multiple crates or boxes or the like can be present. It is also possible that multiple sub pick locations are defined in one storage location.

Where in this document reference is made to robots, also automated guided vehicles can be understood and where reference is made to automated guided vehicles also robots can be understood.

The invention claimed is:

1. A storage system, in particular an automatic storage and retrieval system, comprising:

at least two stationary columns, wherein each of the at least two stationary columns comprise an inner central column, wherein each of the inner central columns
extend in a substantial vertical direction,
comprise multiple vertical levels, and
is substantially hexagonal with six sides, and wherein at each of the multiple vertical levels of each inner central column, a set of storage locations comprising at least six rectangular storage locations is positioned, wherein each of the at least six rectangular storage locations within the set of storage locations has two side walls extending in a horizontal direction away from the inner central column;

wherein at least one of the storage locations within each set of storage locations extends from each of the sides of the respective central column; and wherein, within the set of storage locations, the storage locations are pair-wise arranged on opposite sides of the respective central column;

and wherein at least part of a side wall of at least one of the rectangular storage locations on one of the stationary columns extends parallel to and facing at least part of a side wall of at least one of the rectangular storage locations on another stationary column positioned proximate the other stationary column, and further wherein each of the storage locations are directly accessible from inside the respective inner central column, and wherein each of the at least two stationary columns comprise a bottom level and/or a top level that is free from storage locations and are configured (i) to allow one or more automated vehicles, robots and/or automated loading mechanisms to travel to and from each of the central columns, and/or (ii) to allow at least part of the one or more automated vehicles, robots and/or loading mechanisms to enter each of the inner central columns.

2. The storage system according to claim 1, wherein the inner central column comprises at least three uprights, each of the uprights configured in a corner of the inner central column as a support mechanism.

3. The storage system according to claim 1, wherein the inner central column comprises at least one vertical track for allowing the robot or automated loading mechanism to travel in a vertical direction in the central column.

4. The storage system according to claim 1, wherein each of the storage locations and optionally the central column have substantially the same size or floor plan.

5. The storage system according to claim 1, wherein each of the at least six storage locations comprises a horizontal support for supporting a crate, container, tray, tote, pallet and/or box.

6. The storage system according to claim 1, wherein, from a top view or a bottom view, the central column and the storage locations are configured in a substantially honeycomb shape.

7. The storage system according to claim 1, wherein the at least two stationary columns comprise a multiple of stationary columns positioned substantially next to each other.

8. The storage system according to claim 1, wherein multiple stationary columns are positioned substantially next to each other and positioned on a honeycomb or in a honeycomb-like pattern.

9. The storage system according to claim 1, wherein each of the at least six storage locations comprises a first and a second horizontal support, wherein the first horizontal support is shorter in length than the second support.

10. The storage system according to claim 9, wherein the second horizontal support extends from the central column to a first horizontal support from an adjacent column, and wherein said second horizontal support is connected to said first horizontal support.

11. The storage system according to claim 1, wherein the automated vehicle, robot and/or automated loading mechanism are configured to move vertically in each of the inner central columns and horizontally to and/or from each of the inner central columns.

12. The storage system according to claim 11, wherein the at least one automated vehicle comprises at least two parts, a first base part which is configured for horizontal movements from and/or to each of the inner central columns and a second upper part which is configured for vertical movements in each of the inner central columns.

13. The storage system according to claim 1, wherein the system comprises at least one multifunctional space configured in between and extending in the vertical direction along the side walls of two rectangular storage locations within the same stationary column, wherein the at least one multifunctional space provides accommodation for at least one rectangular storage location of another proximate stationary column.

14. The storage system according to claim 13, wherein the at least one multifunctional space is further provided with an integrated sprinkler system and/or a control system for controlling operation of at least part of said storage system.

15. An assembly of at least two storage systems according to claim 1, wherein at least one first horizontal support of a first storage system is mechanically connected to at least one second horizontal support of a second storage system and wherein the first horizontal support and the second horizontal support mutually enclose an angle in the range of 55-65 degrees.

16. An assembly of at least one storage system according to claim 1 and a racking, wherein the racking comprises vertical racking elements and a top frame connecting at least two vertical racking elements, wherein the racking is configured for placement on a storage floor;

and wherein the storage system is attached to the racking and at least to the top frame, such that there is free space in between the storage system and the storage floor.

17. The storage system according to claim 1, wherein three or more of the at least six storage locations on one of the stationary columns are configured adjacent to and in contact with three or more of the at least six storage locations positioned at the same vertical level on another stationary column.

18. A storage system, comprising an automatic and modular storage and retrieval system, comprising:

multiple modular storage columns, each of the modular storage columns comprising an inner central column, said inner central column extending in a substantial vertical direction and comprising multiple vertical levels;

wherein multiple sets of storage locations are configured along a vertical line, one above the other, each set comprising at least six rectangular storage locations, wherein each storage location has two side walls extending in a horizontal direction away from the inner central column;

wherein the at least six rectangular storage locations within the set of storage locations are pair-wise arranged on opposite sides of the respective inner central column;

wherein each of the inner central column are substantially hexagonal, wherein each storage location of the at least six storage locations at the same vertical level extend from one of the sides of the substantially hexagonal central column; and the system further comprising a load handling device that is configured to move vertically within each of the inner central columns, horizontally to and from the inner central columns, and/or a combination of the same; and wherein the sets of at least six storage locations are accessible from the load handling device in each of the inner central columns; and wherein the system comprising the multiple modular storage columns is arranged in a honeycomb configuration, such that at least one multifunctional space is provided between and extending in the vertical direction along two of the rectangular storage locations within the same storage column, and wherein each of the at least one multifunctional spaces provides accommodation for at least one rectangular storage location of another proximate storage column.

19. The storage system according to claim 18, wherein the load handling device further comprises a rotating platform on top of or as part of the load handling device.

20. The storage system according to claim 18, wherein each of the storage locations is configured for storing uniformly sized crates, totes, boxes, containers, trays, or pallets.

* * * * *